United States Patent [19]
Simpson

[11] Patent Number: 5,514,274
[45] Date of Patent: May 7, 1996

[54] PROCESS FOR THE USE OF A PHOSPHORUS-CONTAINING HYDROPROCESSING CATALYST

[75] Inventor: Howard D. Simpson, Irvine, Calif.

[73] Assignee: UOP, Des Plaines, Ill.

[21] Appl. No.: 415,386

[22] Filed: Apr. 3, 1995

Related U.S. Application Data

[62] Division of Ser. No. 141,277, Oct. 22, 1993, Pat. No. 5,403,806.

[51] Int. Cl.[6] ................................... C10G 45/04
[52] U.S. Cl. ..................... 208/216 PP; 208/216 R; 208/217; 208/251 H; 208/254 H
[58] Field of Search .................... 208/251 H, 254 H, 208/217, 216 R

[56] References Cited

U.S. PATENT DOCUMENTS

| | | |
|---|---|---|
| 3,904,550 | 9/1975 | Pine . |
| 4,202,798 | 5/1980 | Johnson et al. . |
| 4,462,897 | 7/1984 | Miller ............................. 208/254 |
| 4,990,243 | 2/1991 | Winslow et al. ................ 208/251 H |
| 5,178,749 | 1/1993 | Lopez et al. .................... 208/216 R |
| 5,344,553 | 9/1994 | Shih ................................ 208/49 |
| 5,403,806 | 4/1995 | Simpson .......................... 502/335 |

FOREIGN PATENT DOCUMENTS

| | | | |
|---|---|---|---|
| 0266012 | 5/1988 | European Pat. Off. | ....... B01J 27/188 |
| 0319065 | 6/1989 | European Pat. Off. | ......... B01J 27/19 |
| 0377960 | 7/1990 | European Pat. Off. | ........ C04B 35/10 |

*Primary Examiner*—Anthony McFarlane
*Attorney, Agent, or Firm*—Thomas K. McBride; John G. Tolomei; John G. Cutts, Jr.

[57] ABSTRACT

A process for the simultaneous hydrodenitrogenation and hydrodesulfurization of a gas oil utilizing a novel catalyst. The novel hydroprocessing catalyst comprises an overlayer of at least one Group VIB metal component, at least one Group VIII metal component and at least one phosphorous component on a support comprising at least one underbedded phosphorus component combined with a porous refractory oxide, said catalyst having a median pore diameter from about 60 to about 120 Å.

2 Claims, No Drawings

5,514,274

PROCESS FOR THE USE OF A PHOSPHORUS-CONTAINING HYDROPROCESSING CATALYST

This is a divisional of application Ser. No. 08/141,277 filed on Oct. 22, 1993, now U.S. Pat. No. 5,403,806.

BACKGROUND OF THE INVENTION

The invention relates to a hydroprocessing catalyst, its method of preparation and its use for hydroprocessing hydrocarbon-containing oils.

During catalytic hydroprocessing, particulate catalysts are utilized to promote reactions such as desulfurization and denitrogenation. This is accomplished by contacting the particulate catalysts with a feedstock, such as a gas oil, under conditions of elevated temperature and pressure and in the presence of hydrogen so that the sulfur components are converted to hydrogen sulfide, and nitrogen components to ammonia. Hydroprocessing is typically employed to reduce the concentration of nitrogen and sulfur in feedstocks so as to produce hydrocarbons which, when eventually combusted, result in reduced air pollutants of the forms $NO_x$ and $SO_x$. Reducing the concentration of nitrogen is also desirable to protect other refining catalysts, such as hydrocracking catalysts, which deactivate in the presence of nitrogen.

A typical hydroprocessing catalyst contains hydrogenation metals and/or other promoters on a porous refractory oxide support. Hydrogenation metals usually include Group VIB and/or Group VIII active metal components supported on a porous refractory oxide support such as alumina. Other promoters, such as phosphorus components, have also been incorporated in such catalysts. Such catalysts are often prepared by impregnation, that is, the deposition of the active components on the support base by contact thereof with an aqueous solution containing the active components in dissolved form. The impregnated supports are usually calcined, thus converting the promoters to the oxide form, and then the catalyst is activated for use.

An important and continuing aim—in the catalyst refining art—is to discover catalysts of improved activity and/or stability. Increasing the activity of a catalyst increases the rate at which a chemical reaction proceeds under given conditions, and increasing the stability of a catalyst increases its resistance to deactivation, that is, the useful life of the catalyst is extended. In general, as the activity of the catalyst is increased, the conditions required to produce a given end product, such as a hydrocarbon of given sulfur or nitrogen content, becomes more mild. Milder conditions require less energy to achieve a desired product, and the catalyst's life is extended due to such factors as lower coke formation, etc.

Modest or slight variations in compositional characteristics or methods of preparation of hydroprocessing catalysts have been known to have highly unpredictable activity or stability effects on hydrocarbon conversion reactions (such as denitrogenation and/or desulfurization reactions). Three such variable compositional characteristics are: (1) porosity characteristics of the catalyst derived from its porous refractory oxide support; (2) the actual hydrogenation metal promoters (Ni, Co, Mo, W, etc.) and other promoters (P, etc.) in the catalysts; and (3) the percentages of the promoters in the catalyst. Variations of catalyst preparation include impregnation, comulling, coprecipitation, and cogellation.

The petroleum refiner must balance economic considerations, such as the cost of catalyst preparation, with the catalyst characteristics affecting catalyst activity and/or stability. One group of hydroprocessing catalysts providing suitable service to petroleum refiners for hydrodenitrogenation (in terms of both activity and economics) contains nickel or cobalt, molybdenum and phosphorus promoters (commonly called "Ni—P—Mo" or "Co—P—Mo" catalysts) supported on porous refractory oxides having a wide variety of pore size distributions. Each variation in porosity can impart a significant variation in catalyst properties, even for Ni—P—Mo or Co—P—Mo catalysts containing the same relative weight percentages of promoters. Similarly, small variations in the percentages of Ni—P—Mo or Co—P—Mo promoters can alter catalyst properties substantially. Furthermore, slight modifications in catalyst preparation procedures, such as the manner of incorporating the promoters with the refractory oxide supports, or the effective calcination temperature, can likewise unpredictably affect catalyst activity and/or stability properties.

Commercial Ni—P—Mo and Co—P—Mo catalysts having specific narrow pore size distributions and at least 24.5 and 20 weight percent of molybdenum components, calculated as $MoO_3$, respectively, have been useful in hydroprocessing hydrocarbon oils. However, molybdenum is relatively expensive and its relatively high weight percentage contributes significantly to the costs of such commercial hydroprocessing catalysts, and ultimately to the cost of hydroprocessing with the catalyst. A relatively small reduction in the weight percentage of molybdenum and/or better dispersion of molybdenum on a catalyst can result in huge cost savings to the petroleum refiner. On the other hand, phosphorous is considerably cheaper than molybdenum, and an increase in the weight percentage of phosphorous and/or better dispersed promoters due to phosphorus on a catalyst can become economically viable, provided activity and/or stability effects outweigh an increase in cost of manufacture of the catalyst. Accordingly, the petroleum refiner or catalyst manufacturer has a keen economic interest in a catalyst containing a reduced amount of costly molybdenum or a better dispersed molybdenum content when improved catalyst activity and/or stability effects can be achieved with more effective use of phosphorus in the catalyst.

SUMMARY OF THE INVENTION

The invention provides for a catalyst useful for hydroprocessing hydrocarbon-containing oils and a method for preparing such a catalyst by employing multiple calcination steps. In one embodiment, the catalyst is prepared by first producing a calcined particulate containing a phosphorus component and a porous refractory oxide, and subsequently contacting at least one additional catalytic promoter component, such as a Group VIB metal component, with the calcined particulate, and then re-calcining the phosphorus/promoter-containing composition. The finished catalyst contains an overlayer of the catalytic promoter on a support comprised of an "underbedded" phosphorus component combined (bound, as by calcination) with a porous refractory oxide. The method is particularly effective for preparing more highly active phosphorus-containing catalysts having a relatively high percentage of Group VIB metal components (i.e., greater than about 17 weight percent as the trioxide).

In a preferred embodiment, a Ni—P—Mo or Co—P—Mo alumina-containing hydroprocessing catalyst having a narrow pore size distribution contains about 1 to 10 weight percent of nickel or cobalt components (calculated as the monoxide) and about 17 to 30 weight percent of molybdenum components (calculated as $MoO_3$). Prior to incorporation of molybdenum and/or cobalt or nickel components during catalyst preparation, a calcined phosphorus/alumina particulate contains at least 20 percent of the phosphorus components contained in the finished catalyst. Such phosphorus components are incorporated into and/or supported on the alumina-containing support during a calcination step at a temperature below 900° F., and preferably below about 850° F.

The hydroprocessing catalyst of the invention is particularly effective for promoting reactions resulting in simultaneous hydrodenitrogenation and hydrodesulfurization of hydrocarbon oils. Also, the preparation method of the invention allows a catalyst manufacturer to include a smaller weight percentage of relatively expensive Group VIB metal components in a hydroprocessing catalyst to achieve excellent activity and/or stability.

DETAILED DESCRIPTION OF THE INVENTION

The invention is directed to a novel catalyst containing "underbedded phosphorus" components, a novel method of preparation of the catalyst, and a novel process for converting a hydrocarbon-containing feedstock to upgraded hydrocarbon products. In a preferred embodiment, denitrogenation and desulfurization reactions are promoted by a catalyst comprising underbedded phosphorus and at least a partial overlayer of molybdenum (or other Group VIB metal) and/or nickel or cobalt components supported on a porous refractory oxide.

The catalysts employed in the present invention are prepared by first preparing a calcined porous refractory oxide particulate containing at least one phosphorus component and then incorporating at least one additional catalytic promoter thereafter, such as Group VIII and/or Group VIB metals, thus producing catalysts containing underbedded phosphorus. The term "underbedded phosphorus" refers to phosphorus-containing promoter materials, which have been (1) calcined with a support material or precursors of such support material at a temperature greater than 500° F. for at least 0.25 hours, and (2) subsequently contacted with additional catalytic promoter material (which may optionally include more of the same and/or different phosphorus components) and again calcined at a temperature greater than 500° F. for at least 0.25 hours. Additional catalytic promoter components subsequently calcined with the calcined phosphorus-containing particulate include virtually any material known to be catalytically active when supported on or contained in a porous refractory oxide, and can include more of the same phosphorus component contained in the phosphorus-containing calcined particulate. The term "overlayer" refers to the additional catalytic promoter material, particularly molybdenum and/or nickel, being located on the calcined phosphorus-containing support.

Preferably the catalyst of the present invention is essentially free of supported metal components other than molybdenum and nickel. The preferred catalyst of the invention consists essentially of molybdenum, nickel and underbedded phosphorus components supported on the herein described supports. In a more highly preferred catalyst of the invention, the catalyst consists essentially of molybdenum, nickel, underbedded phosphorus components, and additional catalytic phosphorus promoter components.

In the preparation of the catalysts of the present invention, the pore size distribution of the porous support particles may be similar to that of the final catalyst, but such is not necessary or critical. The support material is typically comprised of such porous inorganic refractory oxides as magnesia, silica-magnesia, zirconia, silica-zirconia, titania, silica-titania, alumina, silica-alumina, alumino-silicate, silica, etc. with supports containing gamma alumina being highly preferred. Preferably, the supports are amorphous and essentially free of crystalline materials and, most particularly, are essentially free of crystalline molecular sieve materials. Also, it is preferred that the supports are essentially free of boron or silicon components. Preferred support particles having the preferred physical characteristics disclosed herein are available from Nippon-Ketjen Catalyst Division of AKZO Chemicals, and Criterion Catalyst Company. Mixtures of the foregoing oxides are also contemplated, especially when prepared as homogeneously as possible. Among the useful catalyst materials in the present invention are the supports disclosed in U.S. Pat. No. 4,686,030 issued to Ward, U.S. Pat. No. 4,846,961 issued to Robinson et al., U.S. Pat. No. 4,500,424 issued to Simpson et al., and U.S. Pat. No. 4,849,093 issued to Vauk et al., herein incorporated by reference in their entireties.

The porous refractory oxide support material is usually prepared in the form of shaped particulates, with the preferred method being to extrude a precursor of the desired support (such as a hydrated alumina) through a die having openings therein of desired size and shape, after which the extruded matter is cut or broken into extrudates of desired length. The support particles may also be prepared by mulling (or pulverizing) a precalcined amorphous refractory oxide to a particle size less than about 100 microns and extruding the material.

The extruded particles may have any cross-sectional shape, i.e., symmetrical or asymmetrical, but most often have a symmetrical cross-sectional shape, preferably a cylindrical or polylobal shape. The cross-sectional diameter of the particles is usually about $\frac{1}{40}$ to about $\frac{1}{8}$ inch, preferably about $\frac{1}{32}$ to about $\frac{1}{12}$ inch, and most preferably about $\frac{1}{24}$ to about $\frac{1}{15}$ inch. Among the preferred particles are those having quadralobal cross-sectional shapes resembling that of a four leaf clover, including asymmetrical shapes as well as symmetrical shapes such as in FIG. 1 of U.S. Pat. No. 4,028,227. Other preferred catalyst configurations are cross-sectional shapes resembling that of a three-leaf clover, as shown, for example, in FIGS. 8 and 8A of U.S. Pat. No. 4,028,227. Preferred clover-shaped particles are such that each "leaf" of the cross-section is defined by about a 270° arc of a circle having a diameter between about 0.02 and 0.05 inch. Other particles having ring and minilith shapes are available from Davison Chemical Company, a division of W. R. Grace & Company, as disclosed in U.S. Pat. No. 4,510,261.

Typical characteristics of the amorphous porous refractory oxide supports utilized herein are a total pore volume, median pore diameter and surface area large enough to provide substantial space and area to deposit the active metal components. The total pore volume of the preferred support, as measured by conventional mercury porosimeter methods, is usually about 0.2 to about 2.0 cc/gram, preferably about 0.25 to about 1.0 cc/gram, and most preferably about 0.3 to about 0.9 cc/gram. Surface area (as measured by the B.E.T. method) is typically above about 100 m$^2$/gram, and preferably about 125 m$^2$/gram to about 400 m$^2$/gram. In the broadest sense, the preferred support has a median pore diameter greater than about 50 angstroms, and preferably about 60 to about 100 angstroms. One preferred support has a narrow pore size distribution (as measured by mercury porosimetry) wherein at least about 75 percent, and preferably at least 80 percent of the total pore volume is in pores of diameter from about 20 angstroms above to about 20 angstroms below the median pore diameter. The support preferably has less than about 20 percent of the total pore volume in pores of diameter less than about 60 angstroms and less than about 5 percent of the total pore volume in pores of diameter less than about 50 angstroms, and less than about 20 percent, preferably less than 15 percent of the total pore volume is in pores of diameter greater than about 90 angstroms. Physical characteristics of several amorphous refractory oxide supports utilized in preparation of a catalyst employed in the process of the invention are summarized in Table A as follows:

TABLE A

| Pore Diameter Angstroms | Support T % Pore Volume | Support U % Pore Volume | Support V % Pore Volume | Support W % Pore Volume |
| --- | --- | --- | --- | --- |
| 40–50 | — | 1.6 | 4.0 | 0.9 |
| <50 | 0.8 | 1.9 | — | 1.2 |
| 50–60 | 5.7 | 4.2 | 16.0 | 1.8 |
| 60–70 | 16.4 | 22.5 | 46.0 | 6.1 |
| 70–80 | 29.9 | 61.1 | 28.0 | 21.2 |
| >80 | — | 10.3 | 6.0 | 69.7 |
| 80–90 | 24.6 | 4.1 | — | 55.0 |
| >90 | — | 6.2 | — | 14.7 |
| 90–100 | 9.8 | 0.7 | — | 8.6 |
| 100–110 | 6.6 | 0.6 | — | 0.8 |
| 110–120 | 1.6 | 0.4 | — | 0.5 |
| 120–130 | 0.8 | 0.4 | — | 0.3 |
| >130 | 5.7 | 4.1 | — | 4.5 |
| PORE VOLUME cc/gram (Merc. Poros.) | 0.61 | 0.61 | 0.58 | 0.66 |
| MEDIAN PORE DIAMETER (Merc. Poros.) | 80 | 73 | 67 | 83 |

In the preparation of the catalyst of the invention, a porous refractory oxide or its precursor is first combined and calcined with at least one source of phosphorus component. The phosphorus component can be basic or acidic, with an acidic component preferred.

The combined phosphorus and porous refractory oxide composition is calcined for a sufficient time at a temperature from about 500° F. to about 1,500° F., but typically below 900° F., preferably below 850° F. and most preferably in the range from about 550° F. to about 825° F., and highly preferred below 750° F. The resulting calcined phosphorus-containing particulates ordinarily contain at least one weight percent of phosphorus, calculated as $P_2O_5$, and preferably about 1.5 to about 15, and most preferably from 2 to 12 weight percent. It is highly preferred that the resulting calcined particulates consist essentially of phosphorus components and porous refractory oxide supports, and that no additional catalytic promoters, such as nickel, cobalt, molybdenum, silicon, boron, and the like, be contained on or in the supports.

The calcined particulate containing at least one phosphorus component and the porous refractory oxide is subsequently contacted and further calcined with at least one source of additional catalytic promoter material. Preferred additional catalytic promoter materials include titanium, zirconium, hafnium, vanadium, manganese, magnesium, calcium, lanthanum, copper, Group VIII metals, Group VIB metals, including chromium, molybdenum and tungsten, and phosphorus, including (1) more of the same phosphorus component as contained in the phosphorus-containing calcined particulate and/or (2) different phosphorus components than contained in the phosphorus-containing calcined particulate. Highly preferred additional catalytic promoter materials contain one or more Group VIB metals, with molybdenum being most preferred, and/or Group VIII metals. The Group VIII metal component can be either a noble or non-noble metal, although non-noble metals are preferred. The Group VIII metal is usually selected from the group consisting of ruthenium, platinum, palladium, cobalt, nickel and iron, with nickel being the most highly preferred. The composition containing additional catalytic promoter(s) combined with phosphorus-containing calcined porous refractory oxide is normally calcined for a sufficient time at a temperature from about 500° F. to about 1,200° F., but preferably below about 1,050° F., and most preferably in the range from about 600° F. to about 1,000 F. Typically, the time of all calcination steps disclosed herein is at least 0.25 hours, preferably at least 0.5 hours, and more preferably at least one hour.

To prepare a preferred catalyst, the support material is first compounded with one or more precursors of phosphorus, preferably catalytically active phosphorus, and calcined at a temperature below 900° F., and preferably from about 550° F. to about 850° F. Secondly, the resultant calcined phosphorus/support composition is contacted with a precursor of a molybdenum hydrogenation metal component and, optionally, but preferably, also with precursors of a nickel component. The product composition containing the calcined phosphorus/support, molybdenum, and (optionally) nickel, is then dried and calcined from about 750° F. to about 1,100° F.

The compounding of the phosphorus components support is usually achieved by impregnation and calcination techniques. The impregnations and calcinations may be accomplished by several methods, as for example, by spray impregnation wherein a solution containing the phosphorus precursors in dissolved form is sprayed onto the support particles. Another method is the circulation or multi-dip procedure wherein the support material is repeatedly contacted with the impregnating solution with or without intermittent drying. Yet another method involves soaking the support in a large volume of the impregnation solution, and yet one more method is the pore volume or pore saturation technique wherein support particles are introduced into an impregnation solution of volume just sufficient to fill the pores of the support. On occasion, the pore saturation technique may be modified so as to utilize an impregnation solution having a volume between 10 percent less and 10 percent more than that which will just fill the pores.

In the method of the invention, many phosphorus, nickel and molybdenum compounds are useful for impregnation or comulling. Preferred phosphorus compounds comprise an acid of phosphorus, such as meta-phosphoric acid, pyrophosphoric acid, phosphorous acid, but preferably orthophosphoric acid ($H_3PO_4$), or a precursor of an acid of phosphorus, that is, a phosphorus-containing compound capable of forming a compound containing at least one acidic hydrogen atom when in the presence of water, such as phosphorus oxide, phosphorus, or the like. Preferred compounds include nickel nitrate, nickel acetate, nickel chloride, nickel carbonate and precursors of molybdenum trioxide, such as ammonium dimolybdate and preferably ammonium heptamolybdate.

In the preferred embodiment, impregnation of the porous refractory support with a source of phosphorus is accomplished using a single separate impregnation solution for phosphorus components. Such an impregnation solution typically contains essentially no source of other catalytic promoters, such as nickel or molybdenum components. After formation of the calcined phosphorus/porous refractory oxide support, the other promoter materials may be wholly or partially sequentially impregnated with intervening drying and calcining. If the Group VIII and Group VIB metal precursors are incorporated by impregnation, a subsequent or second calcination at temperatures between about 500° F. and about 1,200° F., converts the Group VIII and Group VIB metals to their respective oxide forms. Calcinations may follow each impregnation of individual promoters. However, some multiple impregnation-calcination procedures may be avoided in alternative embodiments of the invention, as for example, by first comulling the source of phosphorus with the support materials, calcining, and then comulling the molybdenum and nickel promoters with the support materials rather than impregnating the metals thereon. In comulling, precursors of the support materials, usually in a hydrated or gel form, are admixed with precursors of the phosphorus component, either in solid form or in solution, to produce a paste suitable for shaping by known methods, e.g., pelleting, extrusion, etc. A subsequent calcination yields a catalyst containing the active metals in their respective oxide forms.

When the catalyst is prepared by the foregoing or equivalent methods, at least one active Group VIII metal and Group VIB metal (preferably nickel and molybdenum metal) component having hydrogenation activity and phosphorous component are introduced into the catalyst. The catalyst contains the phosphorus component, ordinarily supported on the catalyst, so as to provide acid properties to the catalyst or act as a catalytic promoter. The catalyst typically contains about 0.5 to about 15, and preferably about 2 to about 12 weight percent of phosphorus component (calculated as the pentoxide) and greater than 10, and preferably greater than 17 weight percent of Group VIB metal component (calculated as the trioxide). In a preferred embodiment, the catalyst contains about 0.5 to about 15 percent, usually from 1 to 10 percent, and preferably above 2 percent by weight of nickel, calculated as NiO, and about 1 to about 40 percent, usually from about 17 to about 35 percent, and preferably from 22 to 27 percent by weight of molybdenum, calculated as $MoO_3$. A highly preferred catalyst useful herein contains about 17 to about 27 weight percent, and more preferably about 22 to about 24 weight percent of molybdenum components, calculated as $MoO_3$, and from about 2 to about 13 weight percent of nickel components, calculated as NiO.

The porosity characteristics of the preferred catalyst (as measured by mercury porosimetry) usually vary from those of the support particles or the phosphorus-containing calcined particulates due to the additional hydrogenation metals and/or other promoters contained in the catalyst composition. Ordinarily, the catalyst is prepared so as to have a narrow pore size distribution wherein at least about 75 percent, and preferably at least about 80 percent of the total pore volume is in pores of diameter from about 50 to about 130 angstroms. The catalyst usually has greater than 80 percent of the total pore volume in pores of diameter less than 115 angstroms and greater than 60 percent of the total pore volume in pores of diameter less than 110 angstroms. Ordinarily the catalyst has less than about 10 percent of the total pore volume in pores of diameter below about 50 angstroms and preferably less than about 0.05 cc/gram. Also, the catalyst has less than about 10, and most preferably less than 6 percent of the total pore volume in pores of diameter greater than about 130 angstroms, preferably less than about 0.05 cc/gram in such range; and preferably less than 25 and most preferably less than 20 percent of the total pore volume is in pores of diameter greater than 115 angstroms. It is also preferred that at least 9 percent of the total pore volume be in pores of diameter less than 80 angstroms; and most preferably, at least about 10 percent of the total pore volume in pores of diameter less than 90 angstroms.

The median pore diameter of the catalyst usually lies in the range from about 60 to about 120 angstroms, preferably 70 to about 115 angstroms, and most preferably about 80 to about 110 angstroms.

The catalyst also has a narrow pore size distribution about the median pore diameter, that is, at least about 50 percent, preferably at least about 65 percent, and more preferably at least about 75 percent of the total pore volume is in pores distributed over a narrow range of about 20 angstroms above to about 20 angstroms below the median pore diameter. Another porosity feature of the preferred catalyst is the narrow pore size distribution for pores of diameter greater than the median pore diameter. Ordinarily, at least about 40 percent of the total pore volume is in pores of diameter between the median pore diameter and less than about 90 angstroms, preferably less than about 50 angstroms, and most preferably less than about 25 angstroms above the median pore diameter. With respect to small pores, at least about 40 percent of the total pore volume is in pores of diameter between the median pore diameter and less than about 50, and preferably less than about 25 angstroms below the median pore diameter.

In a preferred embodiment, the catalyst has a narrow pore size distribution wherein at least about 60 percent of the total pore volume is in pores of diameter less than 110 angstroms and at least about 70 percent of its total pore volume is in pores of diameter from about 90 to about 120 angstroms, and at least about 60 percent of the total pore volume is in pores of diameter within about 20 angstroms above or below the median pore diameter of the catalyst, as measured by mercury porosimetry. The preferred catalyst has at least 9 percent of the total pore volume in pores of diameter less than 80 angstroms. The preferred catalyst also has less than 25 percent and preferably less than 20 percent of the total pore volume in pores of diameter greater than 115 angstroms. Preferably, the catalyst is essentially free of crystalline support materials, and, more particularly, is essentially free of at least one crystalline molecular sieve.

Other physical properties of the final catalyst typically include a total pore volume of about 0.20 to about 1.0 cc/gram, and preferably about 0.20 to about 0.70 cc/gram and most preferably about 0.25 to about 0.5 cc/gram and a surface area greater than about 100 m$^2$/gram, and preferably between about 100 and 250 m$^2$/gram with both properties determined by the conventional methods previously disclosed herein.

One preferred catalyst employed in the invention contains above 1 to about 15 weight percent of nickel components, calculated as NiO, from about 17 to about 40 weight percent of molybdenum components, calculated as MoO$_3$, and about 0.5 to about 15 weight percent of phosphorus components, calculated as P, on a phosphorus-containing calcined porous refractory oxide support containing at least about 80 weight percent of gamma alumina. Physical characteristics of this catalyst include a total pore volume of about 0.25 to about 0.50 cc/gram, a surface area from about 100 to about 225 m$^2$/gram and a median pore diameter in the range of about 80 to about 120 angstroms.

A highly preferred catalyst employed in the invention contains about 1 to about 10 weight percent of nickel component, calculated as NiO, from about 17 to about 27, and more preferably from about 22 to about 27 weight percent of molybdenum components, calculated as MoO$_3$, and about 2 to about 15 weight percent of phosphorus components, calculated as P$_2$O$_5$, on a support containing gamma alumina. This catalyst has a surface area from about 125 to about 250 m$^2$/gram, a median pore diameter from about 70 to about 110 angstroms, and a pore size distribution wherein at least about 70 percent of the pore volume is in pores of diameter from about 80 to about 120 angstroms.

Catalysts are activated in accordance with methods suited to a hydrocarbon conversion process, particularly to a hydrodenitrogenation and/or hydrodesulfurization process. Most of the catalysts used in the process of the invention are more active, sometimes even far more active, in a sulfided form than in the oxide form in which they are generally prepared. Accordingly, the catalyst used herein may be sulfided prior to use by any known method (in which case the procedure is termed "presulfiding"), for example, by passing a sulfiding agent in the presence of hydrogen over the catalyst prepared in the calcined form.

If the catalyst is to be used in a sulfided form, it is preferred that a presulfiding procedure be employed. However, since the hydrocarbon conversion process may be employed to upgrade sulfur-containing hydrocarbons (i.e., hydrodesulfurization), one may, as an alternative, accomplish the sulfiding in situ with sulfur-containing hydrocarbon oils, particularly those containing sufficient sulfur to maintain the catalyst in the sulfided form. In another alternative form, the catalyst may be sulfided ex situ by treatment with a sulfur-containing medium prior to loading into a reactor vessel.

Catalysts of the invention may be employed in any of several hydrocarbon conversion processes wherein catalytic composites containing porous support material are known to be catalytically effective. Typical processes include hydrogenation, alkylation, polymerization, desulfurization, denitrogenation, demetallation, hydrocracking, mild hydrocracking, isomerization, reforming, and the like.

The term "hydrocarbon conversion" refers to any reaction wherein a hydrocarbon compound changes chemical composition. As used herein, "hydrocarbon" refers to any compound which consists of hydrogen and carbon, and "hydrocarbon-containing feedstock" refers to any charge stock which contains greater than about 90 weight percent carbon and hydrogen, calculated as the elements. Contemplated for treatment by the process of the invention are hydrocarbon-containing liquids and gases, including broadly all liquid, liquid/vapor and vapor hydrocarbon mixtures including petroleum oils and synthetic crudes. Among the typical feedstocks contemplated are top crudes, vacuum and atmospheric residual fractions, light and heavy atmospheric and vacuum distillate oils, hydrocarbon distillate fractions, shale oils, and oils from bituminous sands and coal compositions and the like. Hydrocarbon compounds converted by the process of the invention include all forms, such as aliphatic, cycloaliphatic, olefinic, acetylenic, aromatic—including alkaryl and arylalkyl aromatic compounds and derivatives thereof—in addition to organometallic, organonitrogen, and organosulfur compounds, particularly those found in conventional hydrocarbon-containing feedstocks. For use herein, typical hydrocarbon oils, or mixtures thereof, may contain at least about 10 volume percent of components normally boiling above about 1,000° F. and in some cases, at least 20 volume percent.

Generally, a substantial proportion (i.e., at least about 90 volume percent) of hydrocarbon feeds, such as gas oils and the like, boil at a temperature less than about 1,100° F., preferably less than about 1,050° F., and usually boil entirely within the range of about 100° F. to about 1,100° F., and most frequently in the range from about 400° F., to about 1,100° F.

Although virtually any high boiling hydrocarbon feedstock may be treated by hydroprocessing with the catalyst of the invention, the process is particularly suited to treating (1) gas oils, preferably light and heavy vacuum gas oils, and (2) heavy residual fractions, especially the treated atmospheric and vacuum residuum oils containing less than about 25 ppmw, preferably less than 5 ppmw and most preferably less than 3 ppmw of contaminant metals (vanadium, nickel, and the like). Sulfur is usually present in the feedstocks in a proportion exceeding 0.1 weight percent and often exceeding 1.0 weight percent. The feedstock contains undesirable proportions of nitrogen, usually in a concentration greater than about 2 ppmw and often between about 2 ppmw and 5,000 ppmw. Ordinarily the feedstock contains less than 200 ppmw of nickel and vanadium contaminant metals, calculated as Ni plus V, with preferred feedstocks containing less than 20 ppmw and most preferably less than 5 ppmw of said materials. The feedstock may contain waxy components, e.g., n-paraffins and slightly-branched paraffins, and thus have a high pour point, e.g., at least about 30° F.

The catalyst may be employed as either a fixed, slurried or fluidized bed (but most usually a fixed bed) of particulates in a suitable reactor vessel wherein a hydrocarbon-containing feedstock (liquid, gaseous, or mixtures thereof) is introduced and subjected to hydrocarbon conversion conditions including an elevated total pressure, temperature, and optionally a hydrogen partial pressure, so as to effect the desired degree of conversion. The feedstock is passed downwardly once through the reactor vessel or maybe recycled therethrough. In some instances, one or more additional reactors may be added to the single reactor, either in series or parallel.

Typical hydrocarbon conversion operation conditions include a temperature from about 50° C. to about 500° C., a pressure from about 50 p.s.i.g. to about 4,000 p.s.i.g., and a liquid hourly space velocity of about 0.05 to about 25 vol/vol-hr. In the presence of hydrogen, the hydrocarbon-containing feedstock contacts the catalyst under hydroprocessing conditions including a hydrogen recycle rate usually about 1,000 to about 15,000, and preferably about 1,000 to about 8,000 standard cubic feet per barrel (scf/bbl). Under such hydroprocessing conditions, the hydrocarbon oil and catalyst are subjected to a hydrogen partial pressure usually in the range from about 100 to about 4,000 p.s.i.g. at a space velocity usually in the range from about 0.05 to about 20 LHSV so as to effect the desired degree of hydroprocessing, as for example, desulfurization and/or denitrogenation.

Typical hydroprocessing conditions that are suitable for hydrodenitrogenation or hydrodesulfurization, or for those processes that yield more than about 10 volume percent conversion of the oil fraction boiling above 1,000° F., to liquid products boiling at or below 1,000° F., are shown in the following Table I:

TABLE I

| Operating Conditions Range | Suitable Range | Preferred |
|---|---|---|
| Temperature, °F. | 500–900 | 600–850 |
| Hydrogen Pressure, p.s.i.g. | 200–4,000 | 500–2,500 |
| Space Velocity, LHSV | 0.05–10 | 0.1–3.0 |
| Hydrogen Recycle Rate, scf/bbl | 500–15,000 | 1,000–10,000 |

Generally, the hydrogen partial pressure maintained during hydroprocessing is more than 50 percent of the total pressure. Usually, for once-through operation, the hydrogen partial pressure is between about 85 and 95 percent of the total pressure while, for recycle operation, the hydrogen partial pressure is somewhat lower, i.e., between 80 and 85 percent of the total pressure.

The hydroprocess of the invention may include either serial or simultaneous desulfurization and denitrogenation of a feedstock. Simultaneous desulfurization, denitrogenation and heavy component (1,000° F. plus components) conversions, as used herein, involves contacting a hydrocarbon oil feedstock with the particulate catalyst disclosed herein under conditions effecting (1) a lower sulfur and nitrogen content in the effluent and/or (2) a higher percentage of liquid products boiling at or below 1,000° F. in the effluent as compared to the feedstock. Serial desulfurization and denitrogenation of a feedstock by contact with the catalyst of the invention involves removing sulfur and nitrogen from the feedstock either prior to or after contact of the feedstock with a catalyst effective for removing a substantial proportion of contaminant metals from the feed.

The invention is further illustrated by the following examples which are illustrative of specific modes of practicing the invention and are not intended as limiting the scope of the invention defined by the appended claims.

EXAMPLE 1

Catalysts A, B and C, prepared in accordance with the invention, are tested under typical hydrodenitrogenation and hydrodesulfurization conditions against a reference commercial hydrodenitrogenation and hydrodesulfurization catalyst, Catalyst R, and against a reference catalyst, Catalyst Y, all having characteristics as summarized in Table II.

All the catalysts are prepared with the same amorphous porous refractory oxide support material, i.e., support U, as disclosed in Table A. The catalysts are prepared by extruding a hydrated alumina-containing material through a die. The extruded matter, having a cross-sectional shape of an asymmetrical quadralobe, is dried, broken into particulates and calcined at approximately 1,200° F. for at least one hour in flowing air. The resulting gamma alumina-containing support particulates have a nominal 1/20 inch cross-sectional width and a pore size distribution having at least 80 percent of the total pore volume in pores of diameter from 50 to 90 angstroms.

Reference Catalyst Y is prepared by pore saturating 100 g of the above-mentioned unimpregnated gamma alumina-containing support particulates with a sufficient amount of an aqueous impregnating solution (i.e., 75 ml) containing molybdenum, nickel and phosphorus. The 75 ml of impregnating solution is obtained from a solution, designated as IY, containing 379.2 g of $MoO_3$, 65.1 g of NiO and 37.0 g of $P_2O_5$, per 660 ml. Sixty (60) ml of IY solution and an additional 4.6 g. of 85% phosphoric acid are diluted with water to 75 ml. The impregnated nickel/molybdenum/phosphorus/alumina composition is allowed to stand (age) for 2 hours following which it is oven-dried at 230° F. and then calcined at 900° F. for one hour in flowing air to produce the finished catalyst having characteristics as summarized in Table II.

Catalysts A, B, and C are prepared as follows:

(A) Three separate 75 ml impregnating solutions are prepared by dissolving into water 4.6 g of 85% phosphoric acid $H_3PO_4$ for use in preparing Catalysts A, B, and C, respectively.

(B) Three 100 g portions of the above-mentioned gamma alumina-containing support particulates are then pore saturated with the respective 75 ml impregnating solutions. Substantially all 75 ml of each impregnating solution is taken up by each of the 100 g portions of the support particulates.

(C) The three separate impregnated phosphorus/alumina compositions for use in preparing Catalysts A, B, and C are each allowed to stand (age) for two hours following which they are oven-dried at 230° F. and then calcined at 750° F., 900° F. and 1100° F., respectively, for one hour in flowing air to produce calcined phosphorus/alumina particulates designated as SA, SB and SC, and each containing respective diphosphorus pentoxide ($P_2O_5$) weight percentages of 2.7. The calcined particulates, SA, SB and SC, are then employed in the further preparation of Catalysts A, B and C, respectively.

(D) Three separate 75 ml above-mentioned IY impregnating solutions are prepared containing nickel, molybdenum and phosphorus.

The three separate portions of the above-prepared calcined phosphorus/alumina particulates (SA, SB and SC) are each pore saturated with one of the three 75 ml IY impregnating solutions containing nickel, molybdenum and phosphorus.

(E) The three separate impregnated nickel/molybdenum/phosphorus/alumina compositions are each allowed to stand (age) for 2 hours following which they are oven-dried at 230° F. and then calcined at 900° F. for one hour in flowing air to produce finished catalyst particles having characteristics as summarized in Table II.

All the tested catalysts have a narrow pore size distribution including at least 70 percent of the total pore volume in pores of diameter from 90 angstroms to 120 angstroms, at least 8 percent of the total pore volume in pores of diameter less than 80 angstroms, and less than 30 percent of the pore volume in pores of diameter above 115 angstroms.

All catalysts are individually tested for their activity for hydrodenitrogenation and hydrodesulfurization with a gas oil feedstock (Gravity=22.7 API, basic nitrogen=1343 ppmw, total nitrogen=3270 ppmw and sulfur=1.84 wt. percent). Each catalyst is pre-sulfided and contacted with the downwardly flowing feedstock in a single-stage, single-pass system with once-through hydrogen. The operating conditions during each run are summarized as follows: 1,400 p.s.i.g. total pressure, 2.0 LHSV, a hydrogen gas rate of 6,000 SCF/bbl and a temperature of approximately 725° F.

Giving the commercial Catalyst R an arbitrary activity of 100, relative volume activity (i.e., RVA) for each catalyst after 60 hours are determined by standard calculation and tabulated in Table II for hydrodenitrogenation activity based on total nitrogen conversion (i.e., RVA N(t)) and for hydrodesulfurization activity (i.e., RVA S).

TABLE II

| Catalyst | Wt. % $MoO_3$ | Wt. % NiO | Wt. % $P_2O_5$ | RVA N(t) | RVA S |
|---|---|---|---|---|---|
| R | 24.5 | 4.0 | 6.8 | 100 | 100 |
| Y | 23.5 | 4.0 | 4.2 | 85 | 77 |
| A | 23.5 | 4.0 | 4.2 | 103 | 141 |
| B | 23.5 | 4.0 | 4.2 | 96 | 107 |
| C | 23.5 | 4.0 | 4.2 | 100 | 121 |

Note: The weight percentage of $P_2O_5$ contained in calcined phosphorus/alumina particulates SA, SB, and SC, used to prepare Catalysts A, B and C, respectively, is 2.7.

The data in Table II indicate that Catalysts A, B and C of the invention are clearly more active for both denitrogenating and desulfurizing a typical hydrocarbon-containing feedstock than reference Catalyst Y and much more active for desulfurization than Catalyst R. The data evidence the superiority of Catalysts A, B and C containing underbedded phosphorus components of at least 1.0, and preferably at least 1.5 weight percent) over the reference catalysts containing no such underbedded phosphorus components.

These results are surprising considering that the reference catalysts contain essentially the same or more molybdenum components than the catalysts of the invention. In the comparison of the invention against commercial Catalyst R, the catalysts of the invention show superiority while containing a lower weight percentage of molybdenum components, i.e., about 1 to 2 lower wt. % ( as $MoO_3$ ), and underbedded phosphorus, particularly in the case of Catalyst A wherein the underbedded phosphorus is calcined with the alumina support at a temperature less than 900° F. F., and preferably less than 800° F. Further, in the comparison of the invention against reference Catalyst Y, prepared with fewer calcinations (and no underbedded phosphorus components) and containing a comparable weight percentage of molybdenum, nickel and phosphorus, the catalysts of the invention show superior denitrogenation and desulfurization activity. Moreover, Catalyst A prepared from phosphorus/alumina particulate SA, which was calcined below 900° F., exhibits unexpectedly superior activity compared to Catalysts B and C, prepared with phosphorus/alumina particulates SB and SC which were calcined at 900° F. and 1100° F., respectively.

While particular embodiments of the invention have been described, it will be understood, of course, that the invention is not limited thereto since many obvious modifications can be made, and it is intended to include within this invention any such modifications as will fall within the scope of the invention as defined by the appended claims.

What is claimed is:

1. A hydroprocess for upgrading a hydrocarbon-containing feedstock in a hydroprocessing zone operated at hydroprocessing conditions including a temperature in the range from about 500° F. to about 900° F., a hydrogen pressure from about 200 to about 4,000 psig and a hydrogen recycle rate from about 500 to about 15,000 standard cubic feet per barrel utilizing a hydroprocessing catalyst comprising an overlayer of at least one Group VIB metal component, at least one Group VIII metal component and at least one phosphorus component on a support comprising at least one underbedded phosphorus component combined with a porous refractory oxide, said catalyst having a median pore diameter from about 60 to about 120 angstroms.

2. A hydroprocess for upgrading a hydrocarbon-containing feedstock in a hydroprocessing zone operated at hydroprocessing conditions including a temperature in the range from about 500° F. to about 900° F., a hydrogen pressure from about 200 to about 4,000 psig and a hydrogen recycle rate from about 500 to about 15,000 standard cubic feet per barrel utilizing a hydroprocessing catalyst prepared by the method comprising:

(a) preparing a calcined particulate containing a phosphorus component and a porous refractory oxide, said calcined particulate prepared at a calcination temperature less than 900° F.;

(b) contacting at least one additional catalytic promotor component with said calcined particulate obtained in step (a); and (c) calcining a composition obtained in step (b).

* * * * *